(12) United States Patent
Reichman et al.

(10) Patent No.: US 7,727,662 B2
(45) Date of Patent: Jun. 1, 2010

(54) LOW TEMPERATURE ALKALINE FUEL CELL

(75) Inventors: Benjamin Reichman, West Bloomfield, MI (US); Michael A. Fetcenko, Rochester, MI (US); Stanford R. Ovshinsky, Bloomfield Hills, MI (US); Kwo Young, Troy, MI (US); William Mays, Commerce, MI (US); James Strebe, Clawson, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 1408 days.

(21) Appl. No.: 10/951,231

(22) Filed: Sep. 27, 2004

(65) Prior Publication Data

US 2005/0064274 A1  Mar. 24, 2005

Related U.S. Application Data

(63) Continuation-in-part of application No. 10/405,008, filed on Apr. 1, 2003, now Pat. No. 6,830,725, and a continuation-in-part of application No. 10/457,624, filed on Jun. 9, 2003, now Pat. No. 7,097,933.

(51) Int. Cl.
*H01M 4/00* (2006.01)
(52) U.S. Cl. .............................. 429/40; 429/41; 429/44; 429/46
(58) Field of Classification Search ................... 429/40, 429/41, 44, 46
See application file for complete search history.

(56) References Cited

U.S. PATENT DOCUMENTS 6,960,406 B2 * 11/2005 Ovshinsky et al. ............ 429/40
7,073,671 B2 *  7/2006 Charkoudian ............... 210/490

* cited by examiner

*Primary Examiner*—Laura S Weiner
(74) *Attorney, Agent, or Firm*—David W. Schumaker (57) ABSTRACT

A low temperature alkaline fuel cell having a hydrogen electrode and an oxygen electrode, both of which are comprised of high performance non-precious metal catalytic materials providing high performance at low temperatures.

33 Claims, 6 Drawing Sheets

LOW TEMPERATURE ALKALINE FUEL CELL

RELATED APPLICATIONS

The present invention is a continuation-in-part of U.S. patent application Ser. No. 10/405,008, entitled "HYDROGEN STORAGE ALLOYS HAVING A HIGH POROSITY SURFACE LAYER", filed Apr. 1, 2003, now U.S. Pat. No. 6,830,725, and U.S. patent application Ser. No. 10/457,624, entitled "CATALYST FOR FUEL CELL OXYGEN ELECTRODES", filed Jun. 9, 2003, now U.S. Pat. No. 7,097,933, both of which are assigned to the same assignee as the current application, the disclosures of which are hereby incorporated by reference.

FIELD OF THE INVENTION

The present invention generally relates to low temperature fuel cells. More particularly, the present invention relates to alkaline fuel cells utilizing high performance hydrogen electrode and oxygen electrode materials which provide the fuel cell with low temperature operating capability with the use of non-precious metal catalysts.

BACKGROUND

As the world's population expands and its economy increases, the atmospheric concentrations of carbon dioxide are warming the earth, causing climate change. However, the global energy system is moving steadily away from the carbon-rich fuels whose combustion produces carbon dioxide gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. The present invention is another product which is essential to shortening the period of decarbonization. It is expected, hydrogen will be used in fuel cells for cars, trucks and industrial plants, just as it already provides power for orbiting spacecraft. But, with the problems of storage and infrastructure solved (see U.S. application Ser. No. 09/444,810, entitled "A Hydrogen-based Ecosystem" filed on Nov. 22, 1999 for Ovshinsky, et al., which is herein incorporated by reference and U.S. patent application Ser. No. 09/435,497, entitled "High Storage Capacity Alloys Enabling a Hydrogen-based Ecosystem", filed on Nov. 6, 1999 for Ovshinsky et al., which is herein incorporated by reference), hydrogen will also provide a general carbon-free fuel to cover all fuel needs. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts such as platinum and palladium are the only useful active materials for the electrodes of the system. Unfortunately, not only are the noble metals costly, they are also susceptible to poisoning by many gases, and specifically carbon monoxide (CO). The proton exchange membrane itself is quite expensive, and because of its low conductivity, inherently limits the power performance and operational temperature range of the P.E.M. fuel cell (the P.E.M. is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuel cells such as higher operating efficiencies, use of less expensive materials of construction, and no need for expensive membranes. The alkaline fuel cell also has higher ionic conductivity electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning and dominate cost of manufacture. While the conventional alkaline fuel cell is less sensitive to temperature than the P.E.M. fuel cell, the active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more thermodynamically efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between hydrogen fuel and hydroxyl ions (OH⁻) present in the electrolyte, which react to form water and release electrons:

$$H_2 + 2OH^- \rightarrow 2H_2O + 2e^-.$$

At the oxygen electrode, oxygen, water, and electrons react in the presence of the oxygen electrode catalyst to reduce the oxygen and form hydroxyl ions (OH⁻):

$$O_2 + 2H_2O + 4e^- \rightarrow 4OH^-.$$

The flow of electrons is utilized to provide electrical energy for a load externally connected to the hydrogen and oxygen electrodes.

The catalyst in the hydrogen electrode of the alkaline fuel cell has to not only split molecular hydrogen to atomic hydrogen, but also oxidize the atomic hydrogen to release electrons. The overall reaction can be seen as (where M is the catalyst):

$$M + H_2 \rightarrow 2MH \rightarrow^{M+} 2H^+ + 2e^-.$$

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction. With the hydrogen storage electrode materials of the inventive instant startup fuel cells, the atomic hydrogen is immediately captured and stored in hydride form, and then used as needed to provide power.

The use of precious metals as catalyst material is prevalent in current fuel cells. Many fuel cells, such as Proton Exchange Membrane (PEM) fuel cells use platinum as the catalytic material within the positive and negative electrodes. While platinum may work well under certain conditions, the use of platinum may result in cost problems for the wide scale production of fuel cells in the years to come. Platinum is currently available for the limited production of fuel cells, but wide scale production of fuel cells utilizing platinum will substantially increase the price and demand for platinum, which will cause the price of fuel cells to be unaffordable for the public resulting in the halt or decrease of fuel cell production. To make fuel cells readily available to the public at affordable prices, alternatives to platinum must be utilized within the fuel cells without a compromise in performance.

Current fuel cells such as PEM, Methanol, Phosphoric Acid, Molten Carbonate, and Solid Oxide, have difficulty operating at ambient temperatures without the use of a heating systems. Of the fuel cells previously listed, PEM and methanol fuel cells have the lowest operating temperature at around 75° C. The other fuel cells have operating temperatures beyond 210° C. High operating temperatures provide design problems when trying to utilize these fuel cells in applications requiring operating conditions at ambient or lower temperatures, such as utilization in automobiles. Heat must be continually supplied to these fuel cells upon startup and during operation to maintain operation. This temperature dependence is detrimental to the wide scale use of fuel cells in a variety of applications operating at ambient temperatures. For fuel cells to gain acceptance as a viable source of power for automobiles, generators, power packs, and the like, fuel cells must be able to operate in a variety of conditions, including low temperatures. The ability for fuel cells to operate at low temperatures is a criteria that is essential for fuel cells to gain acceptance as a viable source of power for a wide variety of applications.

SUMMARY OF THE INVENTION

The present invention discloses an alkaline fuel cell comprising at least one hydrogen electrode having a gas diffusion layer and an active material layer and at least one oxygen electrode having a gas diffusion layer and an active material layer. The active material layer of the hydrogen electrode comprises a hydrogen storage alloy having a bulk region and an interface region having a pore volume greater than 5%.

The gas diffusion layer of the hydrogen electrode comprises a plurality of carbon particles at least partially coated with a hydrophobic material. The gas diffusion layer comprises 20 to 60 weight percent of the hydrophobic material and 40 to 80 weight percent carbon particles.

The interface region of the hydrogen storage alloy in the active material layer of the hydrogen electrode comprises a plurality of catalytic metallic-particles. The catalytic metallic particles may have a diameter of less than 100 Å. The catalytic metallic particles may comprise a transition metal such as nickel, cobalt, copper, iron, or zinc, tin, a nickel-cobalt-copper alloy, or a rare earth metal. The volume fraction of the plurality of catalytic metallic particles in the interface region is preferably greater than 30%. The plurality of catalytic metallic particles may vary in proximity from 2 to 300 Å in the interface region.

The interface region may further comprise a porous support matrix for supporting the catalytic metallic particles. The porous support matrix may comprise one or more of a) a metallic oxide containing one or more metals selected from transition metals, rare earth metals, aluminum, or tin and b) a metallic hydroxide containing one or more metals selected from transition metals, rare earth metals, aluminum, or tin.

The bulk region may comprise magnesium, tin, a transition metal element such as nickel, titanium, vanadium, copper, zinc, or iron, a zirconium alloy, a titanium alloy, a Rare-earth metal alloy, a Misch metal alloy, a magnesium/nickel alloy, or mixtures and alloys thereof. The hydrogen storage alloy may have the formula $La_{10.5}Ce_{4.3}Pr_{0.5}Nd_{1.4}Ni_{64.5}Co_{5.0}Mn_{4.6}Al_{6.0}Cu_{3.4}$ or $La_{10.5}Ce_{4.3}Pr_{0.5}Nd_{1.4}Ni_{64.5}Co_{3.0}Mn_{4.6}Al_{6.0}Cu_{5.4}$.

The gas diffusion layer of the oxygen electrode comprises a plurality of carbon particles at least partially coated with a hydrophobic material. The gas diffusion layer comprises 30 to 60 weight percent of hydrophobic material and 40 to 70 weight percent carbon particles.

The active material layer of the oxygen electrode comprises a supported catalyst comprising a carrier matrix and a mixed-valence nanoclustered metal oxide supported by the carrier matrix. The carrier matrix is preferably carbon based. The mixed-valence nanoclustered metal oxide may include at least one transition metal. The supported catalyst may further comprise an organometallic supported by the carrier matrix. The mixed valence, nanoclustered metal oxide may be in contact with the organometallic. The organometallic may comprise a macrocycle including at least one transition metal. The supported catalyst may further comprise a second carrier matrix and an organometallic substantially uniformly distributed about and supported by the second carrier matrix. The second carrier matrix is preferably carbon based. The mixed valence, nanoclustered metal oxide may comprise mostly cobalt oxides, manganese oxides, or cobalt-manganese oxides.

The present invention discloses in a second embodiment of the present invention a fuel cell hydrogen electrode comprising an active material layer comprising a hydrogen storage alloy having a bulk region and an interface region having a pore volume greater than 5%.

The interface region comprises a plurality of catalytic metallic particles. The interface region may further comprise a porous support matrix for supporting the catalytic metallic particles. The porous support matrix may comprise one or more of a) a metallic oxide containing one or more metals selected from transition metals, rare earth metals, aluminum, or tin and b) a metallic hydroxide containing one or more metals selected from transition metals, rare earth metals, aluminum, or tin. The catalytic metallic particles supported by the porous support matrix may have a diameter of less than 100 Å. The catalytic metallic particles may comprise a transition metal such as nickel, cobalt, copper, iron, or zinc, tin, a nickel-cobalt-copper alloy, or a rare earth metal. The volume fraction of the plurality of catalytic metallic particles in the interface region is preferably greater than 30%. The plurality of catalytic metallic particles may vary in proximity from 2 to 300 Å in the interface region.

The bulk region of the hydrogen storage alloy of the hydrogen electrode may comprise magnesium, tin, a transition metal element such as nickel, titanium, vanadium, copper, zinc, or iron, a zirconium alloy, a titanium alloy, a Rare-earth metal alloy, a Misch metal alloy, a magnesium/nickel alloy, or mixtures and alloys thereof.

DETAILED DESCRIPTION OF THE PREFERRED EMBODIMENTS OF THE INVENTION

The present invention discloses an alkaline fuel cell designed to provide high power at ambient temperatures. The fuel cell includes at least one hydrogen electrode and at least one oxygen electrode, both of which operate concurrently to provide power at ambient temperatures. The hydrogen electrode is supplied with a hydrogen stream and an electrolyte stream and the oxygen electrode is supplied with an oxygen supply, preferably air, and an electrolyte stream.

Figure 1:
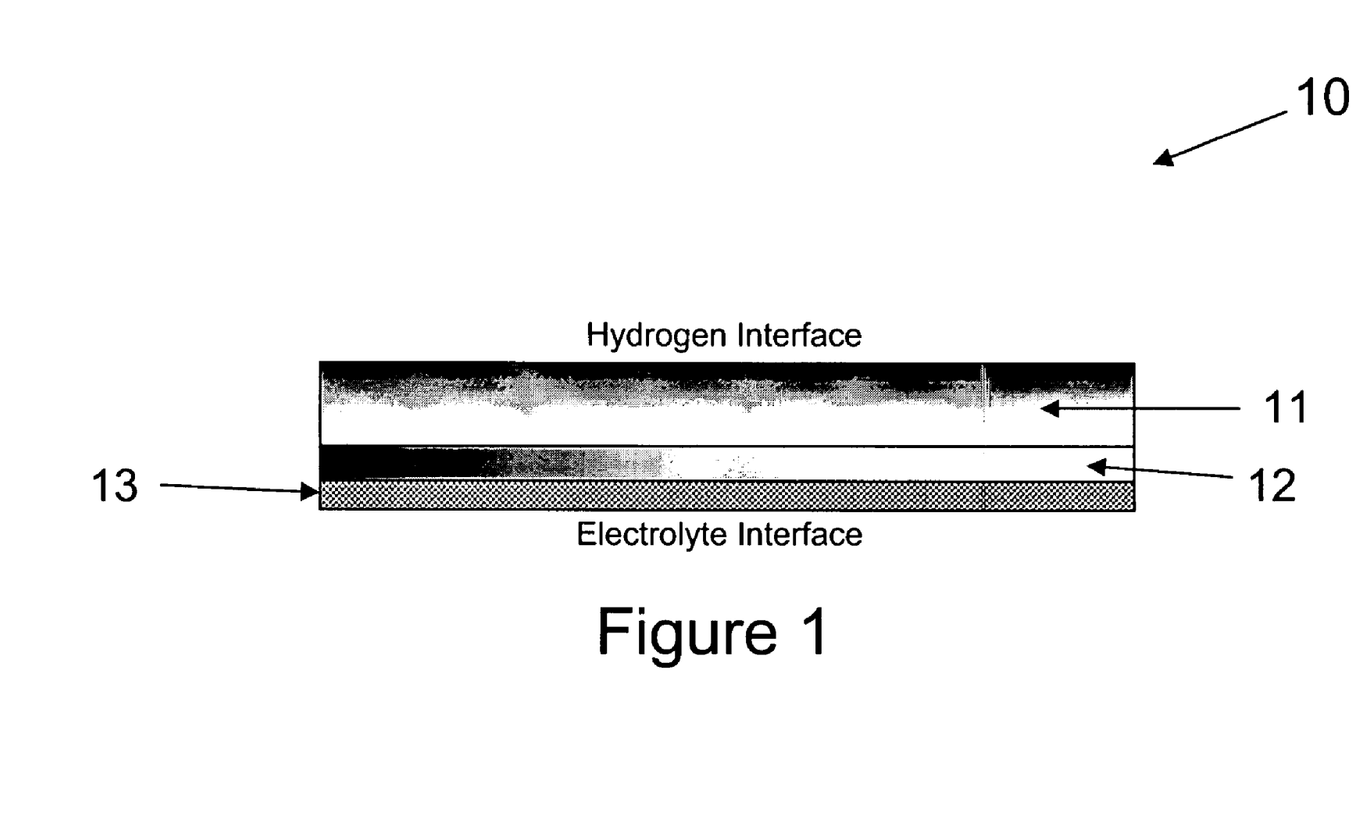
FIG. 1, is a depiction of a hydrogen electrode in accordance with the present invention.

The hydrogen electrode in the preferred embodiment of the present invention has a layered structure and is exemplified in FIG. 1. The layered structure promotes uniform hydrogen distribution across the hydrogen contacting surface of the hydrogen electrode and absorption of the hydrogen into the active material layer. The hydrogen electrode 10 is composed of a gas diffusion 11 layer and an active material layer 12. The gas diffusion layer 11 and the active material layer 12 may be supported by at least one current collector grid 13. The gas diffusion layer 11 and the active material 12 layer are placed adjacent to one another and affixed to at least one current collector grid 13. The gas diffusion layer and active material layer may also be placed adjacent to one another and positioned between two current collector grids forming a sandwich configuration. By using two current collector grids, additional stability is provided to the electrode thereby resulting in a longer lifetime for the electrode. When used inside a fuel cell, the active material layer is in contact with the electrolyte stream while the gas diffusion layer is in contact with the hydrogen stream. While the preferred embodiment of the hydrogen electrode in accordance with the present invention includes a gas diffusion layer and an active material layer, alternative embodiments of the invention may include additional active material layers or gas diffusion layers to vary the hydrophobicity within the electrode as needed.

The hydrogen electrode 10 may utilize a barrier means to isolate the electrolyte, or wet, side of the hydrogen electrode from the gaseous, or dry, side of the hydrogen electrode. A beneficial means of accomplishing this is by inclusion of a hydrophobic component comprising a halogenated organic polymer compound, particularly polytetrafluoroethylene (PTFE) within the gas diffusion layer 11 of the hydrogen electrode to prevent the electrolyte from entering the gas diffusion layer 11 from the active material layer 12. With this in mind, the gas diffusion layer 11 is primarily a carbon matrix composed of carbon particles coated with polytetrafluoroethylene. The carbon matrix is in intimate contact with a current collector grid 13 which provides mechanical support to the carbon matrix. The carbon particles may be carbon black known as Vulcan XC-72 carbon (Trademark of Cabot Corp.), which is well known in the art. The gas diffusion layer may contain approximately 20-60 percent by weight polytetrafluoroethylene with the remainder consisting of carbon particles. The use of carbon particles rather than materials like nickel in the gas diffusion layer allows the amount of polytetrafluoroethylene to vary as needed up to 60 weight percent without clogging the pores in the gas diffusion layer. The polytetrafluoroethylene concentration within the gas diffusion layer may also be continually graded from a high concentration at the side of the gas diffusion layer contacting the active material layer to a low concentration at the side of the gas diffusion layer contacting the current collector grid.

The active material layer 12 of the negative electrode may be comprised of a negative electrode active material including high porosity hydrogen storage alloys that provide high power, at low operating temperatures. While the negative electrode active material is designed for use in an alkaline fuel cell in the preferred embodiment of the present invention, the negative electrode active material may also be used in other fuel cells, such as PEM or direct methanol fuel cells. The high porosity hydrogen storage alloys are formed utilizing the Ovshinsky principles of atomic engineering, chemical modification and total interactive environment to improve the kinetics of hydrogen storage alloys. The improved kinetics achieved with the high porosity hydrogen storage alloys provide significantly improved low temperature operating characteristics. The high porosity hydrogen storage alloys as used in accordance with the present invention are disclosed in detail in U.S. patent application Ser. No. 10/405,008, to Fetcenko et al., entitled "Hydrogen Storage Alloys Having A High Porosity Surface Layer", filed Apr. 1, 2003, the disclosure of which is hereby incorporated by reference.

The high porosity hydrogen storage alloys are composed of one or more modified forms of base alloys represented by the AB, $AB_2$, $AB_5$, $A_2B_7$, or $A_2B$ families of hydrogen storage materials where component A is a transition metal, rare earth element or combination thereof and component B is a transition metal element, Al, or combination thereof. Representative examples of component A include La, Ce, Pr, Nd, and combinations thereof including misch metal. Representative examples of component B include Ni, Co, Mn, Al and combinations thereof. The base alloys may include catalytic metallic particles surrounded by a supporting matrix that has been engineered to improve access of electrochemically and thermally reactive species to catalytic sites, thereby improving kinetics.

Microstructure modification in the negative electrode active material in accordance with the present invention permits control of the porosity of the support matrix surrounding the catalytically active particles and thereby enhances the mobility of relevant molecules or molecular species in electrochemical or thermal charging or discharging processes with respect to the support matrix. The microstructure modification may also provide a higher density of catalytic metallic particles in the interface region of the instant hydrogen storage materials. The microstructure modification leads to better charging and/or discharging kinetics, especially at low temperatures.

Preferably, the porosity of the support matrix is increased through formation of open channels or voids having a cross sectional dimension of 10-20 Å that extend three dimensionally throughout the surface layer. The channels or voids provide pathways to and from catalytic metallic particles that facilitate access of reactant species to and departure of product species from the catalytic metallic particles thereby enhancing the kinetics of charging/discharging processes and hydriding/dehydriding processes. While not wishing to be bound by theory, the present inventors believe that the porosity modifications and/or the increased density of catalytic metallic particles created by microstructure modification of hydrogen storage alloys included in the fuel cell negative electrodes result in superior performance at low temperatures.

Engineering of the porosity of the matrix supporting the metal enriched catalytic regions represents an additional degree of freedom for optimizing the performance of fuel cell negative electrodes. In addition to the intrinsic activity, number, and interactions among and between catalytic sites, hydrogen storage sites, and surrounding material described herein above, high performance further requires that a hydrogen bearing source such as hydrogen gas or water has accessibility to a catalytic site. The concept of accessibility further extends to the ability of byproducts formed during charging or products formed during discharging to depart catalytic sites so that the site may be further utilized.

The base alloys may be modified with one or more microstructure modification elements that act to favorably tailor the properties of the supporting matrix to provide a higher concentration of catalytic metallic particles as well as greater accessibility of reactive species to the catalytic metallic particles. The microstructure modification elements facilitate an accelerated and directed preferential corrosion of the support matrix during activation or operation to provide a more porous and less oxidic support matrix that may also include locally enriched concentrations of catalytic metallic particles at or near the surface of the hydrogen storage alloys.

The surface layer of the hydrogen storage alloys is typically a multicomponent multiphase oxide phase that includes oxides or hydroxides of one or more of the metals present in the formula of the hydrogen storage alloy. Oxides or hydroxides based on different metals exhibit different degrees of corrosion in an electrochemical cell during alloy processing, activation and/or operation. The corrosion effects ordinarily encountered during activation and/or operation of an electrochemical cell may become exaggerated in the presence of a microstructure modification element and as a result, a more porous support matrix may be formed. Accelerated and preferential corrosion may also occur or be facilitated in later processing through control of processing parameters (e.g. heat treatment temperature, processing ambient, time of contact with air etc.) during alloy formation, annealing, treatment, or operation or through inclusion of etching steps upon or during alloy formation. Etching steps may include basic and/or acidic etching processes designed to selectively or preferentially etch one or more elements or oxides or hydroxides thereof in the interface region of a hydrogen storage alloy thereby rendering the interface region more porous. The interface region may be etched to the point wherein the catalytic metallic particles may become self supporting.

As the support matrix becomes more porous and less oxidic, the catalytic metallic particles may become at least partially self supporting. The modifications of the support matrix provided by the microstructure modification elements increase the number of catalytic sites and facilitate access of reactants to catalytic sites as well as departure or transport of reaction products from catalytic sites thereby providing faster kinetics for hydriding/dehydriding and charging/discharging processes of the hydrogen storage alloys. The microstructure modification elements may include Cu, Fe, Al, Zn and Sn.

Representative $AB_5$ alloys prepared using the above method are presented in Table 1. In these alloys, component A is mischmetal and component B is a combination of transition metals. The compositions shown in Table 1 are in at. % and correspond to molar proportions. Entries of 0 indicate that the element was not intentionally included in the preparation of the alloy. The B and B0 alloys are conventional alloys that are not modified according to the instant invention. The B alloy is a typical commercial alloy composition and the B0 alloy is similar to commercial alloys. The alloys B1, B3, B4, and B7-B12 include one or more microstructure modification elements such as Cu, Fe, and Zn and correspond to modified forms of the base alloy B0 according to the instant invention. The alloys B2, B5 and B6 include excess Ni relative to B0.

TABLE 1

| alloy | La | Ce | Pr | Nd | Ni | Co | Mn | Al | Cu | Fe | Zn |
|---|---|---|---|---|---|---|---|---|---|---|---|
| B | 10.5 | 4.3 | 0.5 | 1.4 | 60.0 | 12.7 | 5.9 | 4.7 | 0 | 0 | 0 |
| $B_0$ | 10.5 | 4.3 | 0.5 | 1.4 | 64.5 | 8.4 | 4.6 | 6.0 | 0 | 0 | 0 |
| $B_1$ | 10.5 | 4.3 | 0.5 | 1.4 | 64.5 | 5.0 | 4.6 | 6.0 | 3.4 | 0 | 0 |
| $B_2$ | 10.5 | 4.3 | 0.5 | 1.4 | 67.9 | 5.0 | 4.6 | 6.0 | 0 | 0 | 0 |
| $B_3$ | 10.5 | 4.3 | 0.5 | 1.4 | 65.5 | 5.0 | 4.6 | 6.0 | 0 | 2.4 | 0 |
| $B_4$ | 10.5 | 4.3 | 0.5 | 1.4 | 65.9 | 5.0 | 4.6 | 6.0 | 2.0 | 0 | 0 |
| $B_5$ | 10.5 | 4.3 | 0.5 | 1.4 | 69.9 | 3.0 | 4.6 | 6.0 | 0 | 0 | 0 |
| $B_6$ | 10.5 | 4.3 | 0.5 | 1.4 | 71.5 | 3.0 | 3.0 | 6.0 | 0 | 0 | 0 |
| $B_7$ | 10.5 | 4.3 | 0.5 | 1.4 | 63.0 | 5.0 | 4.6 | 6.0 | 4.9 | 0 | 0 |
| $B_8$ | 10.5 | 4.3 | 0.5 | 1.4 | 61.5 | 5.0 | 4.6 | 6.0 | 6.4 | 0 | 0 |
| $B_9$ | 10.5 | 4.3 | 0.5 | 1.4 | 62.7 | 8.4 | 3.0 | 6.0 | 3.4 | 0 | 0 |
| $B_{10}$ | 10.5 | 4.3 | 0.5 | 1.4 | 64.5 | 5.0 | 4.6 | 6.0 | 1.7 | 0 | 1.7 |
| $B_{11}$ | 10.5 | 4.3 | 0.5 | 1.4 | 64.5 | 5.0 | 4.6 | 6.0 | 0 | 0 | 3.4 |
| $B_{12}$ | 10.5 | 4.3 | 0.5 | 1.4 | 64.5 | 3.0 | 4.6 | 6.0 | 5.4 | 0 | 0 |

Preferably, the negative electrodes in accordance with the present invention include the high porosity $B_1$ alloy ($La_{10.5}Ce_{4.3}Pr_{0.5}Nd_{1.4}Ni_{64.5}Co_{5.0}Mn_{4.6}Al_{6.0}Cu_{3.4}$) or the high porosity $B_{12}$ alloy ($La_{10.5}Ce_{4.3}Pr_{0.5}Nd_{1.4}Ni_{64.5}Co_{3.0}Mn_{4.6}Al_{6.0}Cu_{5.4}$). The $B_1$ and $B_{12}$ alloys provide a higher power than the conventional alloy ($La_{10.5}Ce_{4.3}Pr_{0.5}Nd_{1.4}Ni_{60.0}Co_{12.7}Mn_{5.9}Al_{4.7}$) at low temperatures.

In the absence of hydrogen storage alloys with microstructure modification as described above, the active material of the hydrogen electrode may include base hydrogen storage alloys having metal enriched catalytic regions that include catalytically active particles comprised of nickel, nickel alloys as well as other metals or metal alloys. The active material of the hydrogen electrode may also include finely divided non-noble metal catalysts including nickel and/or nickel alloys.

One type of base alloy having an enriched catalytic region including nickel is described in detail in U.S. Pat. No. 5,536,591 to Fetcenko et al., entitled "ELECTROCHEMICAL HYDROGEN STORAGE ALLOYS FOR NICKEL METAL HYDRIDE BATTERIES", filed Apr. 17, 1995 (the '591 patent), the disclosure of which is hereby incorporated by reference.

The production of the Ni regions of the alloys of the '591 patent are consistent with a relatively high rate of removal through precipitation of certain oxides from the surface of the hydrogen storage alloy and a much lower rate of nickel solubilization providing a degree of porosity to the surface. This may be accomplished via preferential corrosion. The resultant surface has a higher concentration of nickel than would be expected from the bulk composition of the hydrogen storage alloy. Nickel in the metallic state is electrically conductive and catalytic, imparting these properties to the surface of the hydrogen storage alloy. As a result, the surface of the hydrogen storage alloy is more catalytic and conductive than if the surface contained a higher concentration of insulating oxides.

The enriched Ni region of the hydrogen storage alloy may be produced by specifically formulating a hydrogen storage alloy having a surface region that is preferentially corroded during activation to produced the enriched Ni regions. Without wishing to be bound by theory, it is believed, for example, that Ni is in association with an element such as Al at specific surface regions and that this element corrodes preferentially during activation, leaving behind enriched nickel regions. "Activation" as used herein specifically refers to "etching" or other methods of removing excessive oxides, such as described in U.S. Pat. No. 4,716,088, as applied to electrode alloy powder, the finished electrode, or at any point in between in order to improve the hydrogen transfer rate.

Another type of base hydrogen storage alloy having an enriched catalytic region is described in detail in U.S. Pat. No. 6,270,719 to Fetcenko et al., entitled "MODIFIED ELECTROCHEMICAL HYDROGEN STORAGE ALLOY HAVING INCREASED CAPACITY, RATE CAPABILITY, AND CATALYTIC ACTIVITY", filed Apr. 12, 1999 (the '719 patent), the disclosure of which is hereby incorporated by reference.

The hydrogen storage alloys of the '719 patent have superior catalysis and high rate discharge performance which is achieved by one or more of the following:

1) the catalytic metallic sites of the hydrogen storage alloys are formed from a nickel alloy such as NiMnCoTi rather than just Ni;

2) the catalytic metallic sites of the hydrogen storage alloys are converted by elemental substitution to an FCC structure from the BCC structure of the normal nickel sites;

3) the catalytic metallic sites of the hydrogen storage alloys are much smaller in size (10 to 50, preferably 10 to 40, most preferably 10 to 30 Å) than the normal Ni sites (50 to 70 Å) and have a finer distribution (closer proximity);

4) the catalytic metallic sites of the hydrogen storage alloys are surrounded by an oxide of a multivalent material (containing $MnO_x$) which is believed to possibly be catalytic as well, as opposed to the ZrTi oxide which normally surrounds the Ni sites;

5) the oxide could also be multiphase with very small (10 to 20 Å) Ni particles finely distributed in a MnCoTi oxide matrix;

6) the oxide may be a mix of fine and coarse grained oxides with finely dispersed catalytic metallic sites;

7) alloy modification with aluminum may suppress nucleation of large (50 to 70 Å) catalytic metallic sites (at 100 Å proximity) into a more desirable "catalytic cloud" (10 to 20 Å in size and 10 to 20 Å proximity); and 8) NiMn oxide is the predominant microcrystalline phase in the oxide and the catalytic metallic sites may be coated with NiMn oxide.

A finely divided catalyst non-noble metal catalyst is described in detail in U.S. patent application Ser. No. 09/523,820 to Fetcenko et al., entitled "FINELY DIVIDED METAL CATALYST AND METHOD FOR MAKING SAME," filed Mar. 13, 2000 (the 'XXX patent), the disclosure of which is hereby incorporated by reference. These non-noble metal catalysts generally comprise a metal particulate and a support. The metal particulate may be affixed to the surface of the support and/or at least partially embedded within the support.

The metal particulate may comprise nickel particles and/or nickel alloy particles. The metal particulate may include one or more modifier elements selected from Al, Co, Sn, Mn, Ti, and Fe. The addition of the modifier elements to the nickel to form a nickel alloy increases the surface roughness of the metal particles which increases access to the catalytic sites within the metal particulate. The addition of the modifier elements may also inhibit poisoning of the catalyst by preventing the build-up of one or more passivating oxides on the surface of the metal particulate or providing resistance to contaminants such as $H_2S$, $CH_4$, $CO_2$, and CO. The metal particulate may have an average particle size between 10 and 70 Å, preferably between about 10 and 50 Å, more preferably between about 10 and 40 Å, and most preferably between about 10 and 30 Å.

The support may be any support generally known in the art, capable of supporting and providing adequate dispersion for the metal particulate. The support preferably has a surface area and/or porosity sufficient to provide an adequate dispersion of the metal particles allowing both penetration of electrolyte for the reactions at the hydrogen electrode while not allowing the electrolyte to penetrate through to the hydrogen contacting side of hydrogen electrode. Examples of supports are silica, alumina, carbon, manganese oxides, an oxide of nickel and manganese, and oxide of nickel, manganese, cobalt, and titanium, an oxide of nickel, manganese, cobalt, titanium, and iron, an oxide of nickel, manganese, cobalt, and titanium, and an oxide of titanium and zirconium.

Figure 2:
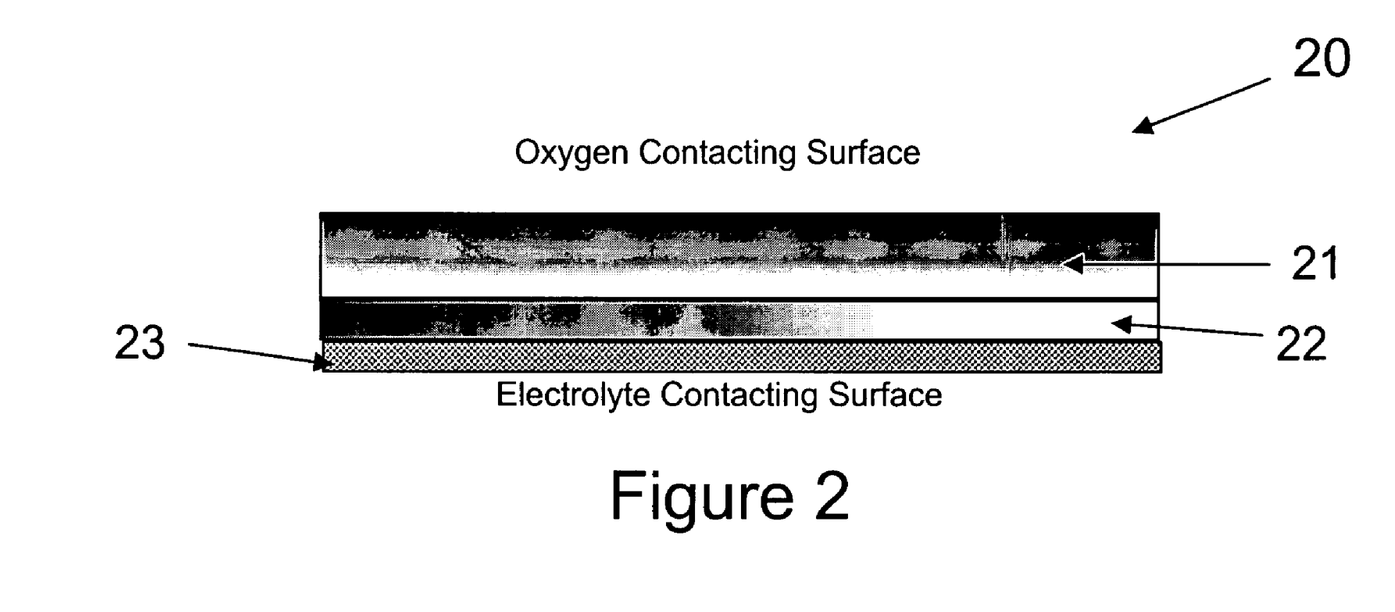
FIG. 2, is a depiction of an oxygen electrode in accordance with the present invention.

The oxygen electrode in the preferred embodiment of the present invention has a layered structure and is exemplified in FIG. 2. The layered structure promotes oxygen dissociation and resistance to flooding within the oxygen electrode. The oxygen electrode 20 includes a gas diffusion layer 21, and an active material layer 22. The gas diffusion layer 21 and the active material layer 22 may be supported by at least one current collector 23. The active material layer 22 contains a catalyst which enhances the rate of oxygen reduction. The gas diffusion layer 21 and the active material layer 22 may be placed adjacent to one another with the current collector 23 being placed in contact with the active material layer 22. Alternatively, two current collectors may be used with a current collector being placed outside the gas diffusion layer and a current collector being placed outside the active material layer to form a sandwich configuration. By using two current collector grids, additional stability is provided to the electrode thereby resulting in a longer lifetime for the electrode. When used inside a fuel cell, the active material layer may be placed in contact with the electrolyte solution while the gas diffusion layer may be placed in contact with the air or oxygen stream.

The oxygen electrode 20 preferably has a hydrophobic component, which provides a barrier for isolating the electrolyte, or wet, side of the oxygen electrode from the gaseous, or dry, side of the oxygen electrode. The hydrophobic component may include a halogenated organic polymer compound, such as polytetrafluoroethylene (PTFE). The hydrophobic component may be combined with carbon particles in the gas diffusion layer to form a carbon matrix with a desired hydrophobicity. The carbon matrix may also be formed with carbon particles coated with a polymer compound, such as PTFE coated carbon particles. The carbon matrix provides a porous matrix with pathways for oxygen to travel to the electrolyte contacting side of the oxygen electrode and enhances the dissociation of molecular oxygen into atomic oxygen. The carbon particles may be carbon black, such as Vulcan XC-72 carbon (Trademark of Cabot Corp.), Acetylene Black, etc. The gas diffusion layer may contain approximately 30-60 percent by weight of polymer with the remainder consisting of carbon particles.

The active material layer 22 is supported by the current collector and may be composed of coated carbon particles and a catalyst. The coated carbon particles are preferably coated with polytetrafluoroethylene, which preferably contain approximately >0-20% polytetrafluoroethylene by weight. The catalyst may be blended with the coated carbon particles, deposited on the coated carbon particle or deposited directly to the electrode to form a layer of the active catalyst material on the surface of the active material layer. The catalyst may be graded from a high concentration on the surface to a lower concentration inward of the bulk of the active material layer. The thickness of this layering or grading may be anywhere from as thin as 30 Å or less to as thick as 2 microns or more, depending upon the activity of the chosen material and the requirements of the fuel cell.

The current collector 23 provides a conductive pathway for electrical current to travel. The current collector preferably extends throughout the entire oxygen electrode 20. The current collector is preferably in electrical communication with the catalytically active material, and may be in direct contact therewith. The current collector may comprise an electrically conductive mesh, grid, foam, expanded metal, or combination thereof. For example, a preferable current collector comprises a conductive mesh having about 40 wires per inch or less horizontally and about 20 wires per inch or less vertically. The wires comprising the mesh may have a diameter between 0.005 inches and 0.01 inches, preferably between 0.005 inches and 0.008 inches. This design provides enhanced current distribution due to the reduction of ohmic resistance.

The catalyst comprises a catalytically active material supported on a carrier matrix. The catalytically active material may comprise mixed-valence, nanoclustered metal oxide(s), an organometallic material, or a combination thereof. The catalytically active material is preferably provided at a loading of: 30% by weight or less, 20% by weight or less, 10% by weight or less, 5% by weight or less, but more preferably at a loading of 1% to 5% by weight. The catalyst may be particularly useful for enhancing the rate of oxygen reduction in an oxygen electrode of a fuel cell. The catalyst may also be useful for catalyzing hydrogenation, hydro-cracking, hydrogen oxidation, reduction alkylation, ammonolysis, and electrochemical reactions.

As mentioned above, the catalytically active material may comprise a mixed-valence, nanoclustered metal oxide. Mixed-valence, nanoclustered metal oxides can provide a diverse range of active sites for enhancing the rate of a multi-step reaction. Mixed-valence oxide is any mixture of oxides of more than one valence state. The valence states preferably include more than one of the +1, +2, +3, +4 and +5 oxidation states. The mixed-valence, nanoclustered metal oxide may include oxides having a plurality of valence states, such as two, three, four or more different valence states. The average valence of any particular nanocluster may be between 0 and +5, 0 and +1, +1 and +2, +2 and +3, +3 and +4 and +4 and +5. A preferred mixed-valence nanoclustered metal oxide is from +1 to +3. The nanoclusters may include a higher concentration of metal atoms in a lower oxidation state than metal atoms in a higher oxidation state. The ratio of atoms in the higher oxidation state to the atoms in the lower oxidation state may range from 1:4 to 3:4, preferably 1:3 to 2:3, or more preferably 1:2 to 2:3. Providing nanoclusters with a higher concentration of metal atoms having a lower valence state than higher valence state can allow for a more favorable reaction rate in a multi-step reaction mechanism.

The mixed-valence, nanoclustered metal oxide may be multi-functional. A multi-functional nanoclustered metal oxide has one component that provides a rate of reaction that favors a first reaction step and another component that provides a rate of reaction that favors a second reaction step over the first. By providing a multi-functional catalytically active material, complex reactions having multiple steps can be more effectively driven.

The mixed-valence, nanoclustered metal oxide may be multicomponent. A multicomponent nanoclustered metal oxide has more than one element. Preferred multicomponent nanoclustered metal oxides have two or more, three or more or even four or more elements. Preferred elements include those selected from the transition metals, such as nickel, cobalt, manganese, etc. Multicomponent nanoclusters can provide improved catalytic activity for complex reactions and can synergistically interact to outperform single element, uniform clusters. The multiple elements may be provided in solid solution to form the multicomponent oxide. Preferred multicomponent oxides include those that are mostly cobalt oxide, mostly nickel oxide or mostly manganese oxide. Preferred multicomponent oxides include cobalt-manganese oxide, cobalt-nickel, nickel-manganese oxide, cobalt-manganese-nickel oxide. The multicomponent oxide may include one or more of the noble metals, such as Ag, Au, Pt, etc. However, due to the costs associated with using noble metals and the performance that can be achieved without them, the multicomponent oxide preferably includes less than 10%, more preferably less than 2% and more preferably less than 1% noble metals by weight. A preferred multicomponent metal oxide is essentially noble metal free.

Nanoclusters are small regions in the nanometer size range of 0.01 nm to 1000 nm. Preferably, the nanoclusters are 0.1-50 nm in size, and more preferably 10 to 300 A in size. The nanoclusters may be partially crystalline, polycrystalline, microcrystalline, nanocrystalline, essentially amorphous, or amorphous. The nanoclusters may be formed of small crystallites or grains which themselves may be highly ordered oxides in the size range of 10-1000 A. The nanoclusters may be agglomerated to form a continuous or substantially continuous coating that has a thickness that is on the nanometer scale, e.g. of 0.01 nm to 1000 nm thick. The nanoclusters may be regions of varying thickness or density, such as thicker or denser towards the middle of a cluster. Regions of varying thickness permit the topology of the nanoclusters to be altered to increase surface area and catalytic activity. The nanoclusters may include small grains of differing orientation. Having nanoclusters with small grains of differing orientation can permit stacking of grains to increase the number and availability of grain boundaries to improve catalytic activity. The nanoclusters may include 10 to 100 crystallites or grains each. The grains may have a diameter of 150 A or less, preferably 100 A or less, but are preferably between 2 and 20 A. Nanoclusters having a small grain size permit greater accessibility of reactants to the active sites. The grains may have a spinel crystal structure. The nanoclusters may be highly ordered oxides, such as 100 A-500 A in size. Highly ordered oxides can have the properties of metals to provide enhanced catalytic activity, but are not in the $0^+$ oxidation state. The nanoclusters or agglomerations of nanoclusters preferably have a high density. A high density may be provided by having nanoclusters or agglomerations of nanoclusters in close proximity to one another. A high density of nanoclusters provides additional active sites for improved catalytic activity. The proximity of nanoclusters and/or agglomerations preferably includes spacing of 1 to 100 A and more preferably 2 to 40 A. The shape, size, form, proximity, density and ultimate activity of the nanoclusters may be controlled by the method of forming. By changing the method of how the nanoclusters are formed: the size, shape, density, grain stacking, and topology of the clusters can be atomically engineered.

The mixed-valence, nanoclustered catalytic material may be formed about the carrier matrix by any suitable means, such as by precipitation, electrodepositing, impregnation, electroless deposition, sputtering, etc. The nanoclusters may be formed on, absorbed to, bonded rigidly thereto, dispersed about, electro-statically held, or simply contact the carrier matrix. The carrier matrix in turn may support the catalytically active material directly or indirectly. The mixed-valence, nanoclustered metal oxides are preferably formed on a carrier matrix via electroless deposition. More preferably, a controlled precipitation process that includes forming a metal complex and breaking down the complex in a controlled manner to form the nanoclusters is used. By controlling the manner and rate in which the catalytically active material is formed, different properties for materials having the same chemical composition can be provided.

A controlled precipitation process may be provided by dissolving a metal salt into a solution to form a metal salt solution and combining the metal salt solution with a complexing agent to form a metal complex. The metal complex may then be combined with a suspension of the carrier matrix. The complex may be broken down in a controlled manner by reducing the strength of the complex to electrolessly deposit an oxide about the carrier matrix. For example, a carrier matrix, such as carbon black, may be wetted with an organic solvent, such as a polar organic solvent like acetone, to form a suspension. A metal complex can then be combined with the wetted carbon and aggressively mixed. An agent, such as an acid or base, can then be added to the combination to break down the metal complex so that a catalyst forms on the carbon. The formation of the catalyst may be done in an ultrasonic bath using sonication. The catalyst may then be separated from any excess solution, dried and/or heat treated as desired.

The controlled precipitation may be done at a fast or slow rate. A fast deposition rate deposits the catalytically active material about the carrier matrix in 24 hours or less, while a slow deposition rate deposits the catalytically active material about the carrier matrix in more than 24 hours. It has been found that by altering the rate at which nanoclusters are formed, the activity of the catalyst can be changed. Preferably, deposition is done at the slow rate. Deposition rates may be adjusted in a number of ways, such as by altering temperatures, concentrations, pH, the amount of the complex present, etc. Deposition rate may also be controlled by increasing or decreasing the rate at which the metal complex is weakened.

For example, a complex may be prepared by adding a metal salt to excess ammonium hydroxide and then reducing the excess ammonium ion. Further, the reaction may be controlled by adjusting the concentration of ammonium in the headspace. By increasing or decreasing the amount of ammonium in the headspace, the deposition rate and/or crystallite size of the catalyst may be controlled.

The catalytically active material may include an organometallic. The organometallic is preferably a macrocycle including one or more transition metals, such as cobalt tetramethoxyphenyl porphyrin (CoTMPP), manganese tetramethoxyphenyl porphyrin (MnTMPP), or a combination of CoTMPP and MnTMPP. The organometallic may be atomically layered on the carrier matrix. Atomically layering the organometallic provides active sites for catalytic activity without isolating underlying material. Atomic layering can also be used to adjust the proximity of the organometallic to adjacent materials to alter the overall chemistry of active sites, such as atomically layering the organometallic next to nanoclusters or other catalytically active materials.

The organometallic may be formed about the carrier matrix in any suitable way, such as directly onto the carrier matrix or onto a material supported by the carrier matrix, such as onto mixed-valence, nanoclustered metal oxides. The organometallic may be formed about the carrier matrix by first preparing a solution of organometallic material and then combining the solution with the carrier matrix. The solution preferably includes an organic solvent. A preferred solvent is a polar organic solvent, such as acetone, however, other organic solvents may be substituted depending upon the organometallic's solubility and the carrier matrix.

The carrier matrix may be any suitable support material based on the reaction medium of the ultimate end use. The carrier matrix is preferably carbon based. A carbon based carrier matrix is particularly useful for supporting catalytically active material in a fuel cell oxygen electrode because of its ability to help dissociate molecular oxygen into atomic oxygen. The carrier matrix is preferably an agglomerated, filamentary carbon based material. The carrier matrix may include a plurality of strands having a diameter of 20 um or less. The carrier matrix preferably has a low density and/or high surface area. The carrier matrix may be a banded linear structure with an ill defined boarder, such as fluffy carbon, or may be stratified in one or more directions. The carrier matrix may be intertwined with non-distinct edges having a vertical extent which goes into the middle of the carrier region with a more dense matrix embedded towards the center of the mass. The carrier matrix may also/or alternatively have a distinct up and down wavelike pattern, may be uniform, diffuse or wispy with distinct edges. By having a dispersed carbon matrix, increased surface area can be provided while maintaining adequate support and accessibility of the catalytically active material.

In a preferred embodiment of the present invention, the catalyst comprises mixed-valence, nanoclustered metal oxide distributed about and supported by a carrier matrix and organometallic material distributed over the mixed-valence, nanoclustered metal oxide. A catalyst having an organometallic distributed over nanoclusters may be made by depositing the nanoclusters about a carrier matrix and then supplying the organometallic about the nanoclusters using one or more of the above procedures. By using two or more different catalytically active materials about the same carrier matrix in close proximity to one another, new and different chemistries can be achieved.

In another preferred embodiment of the present invention, the catalyst comprises organometallic material distributed about and supported by a carrier matrix and mixed-valence, nanoclustered catalysts substantially distributed over the organometallic material. A catalyst having nanoclusters distributed over organometallic material may be made by dispersing the organometallic material over a carrier matrix and then supplying the nanoclusters over the organometallic material using one or more of the procedures described above. By using two or more different catalytically active materials about the same carrier matrix in close proximity to one another new and different chemistries can be achieved.

In another preferred embodiment of the present invention there is provided a composite mixture of catalytic material that includes mixed-valence, nanoclustered metal oxides distributed about and supported by a first carrier matrix and organometallic material substantially uniformly distributed over and supported by another carrier matrix. The composite catalyst may be made by making mixed-valence, nanoclustered metal oxide catalyst as described above and making an organometallic catalyst as described above and blending the two together. A composite catalyst can provide improved catalytic activity for complex reactions.

Figure 3:
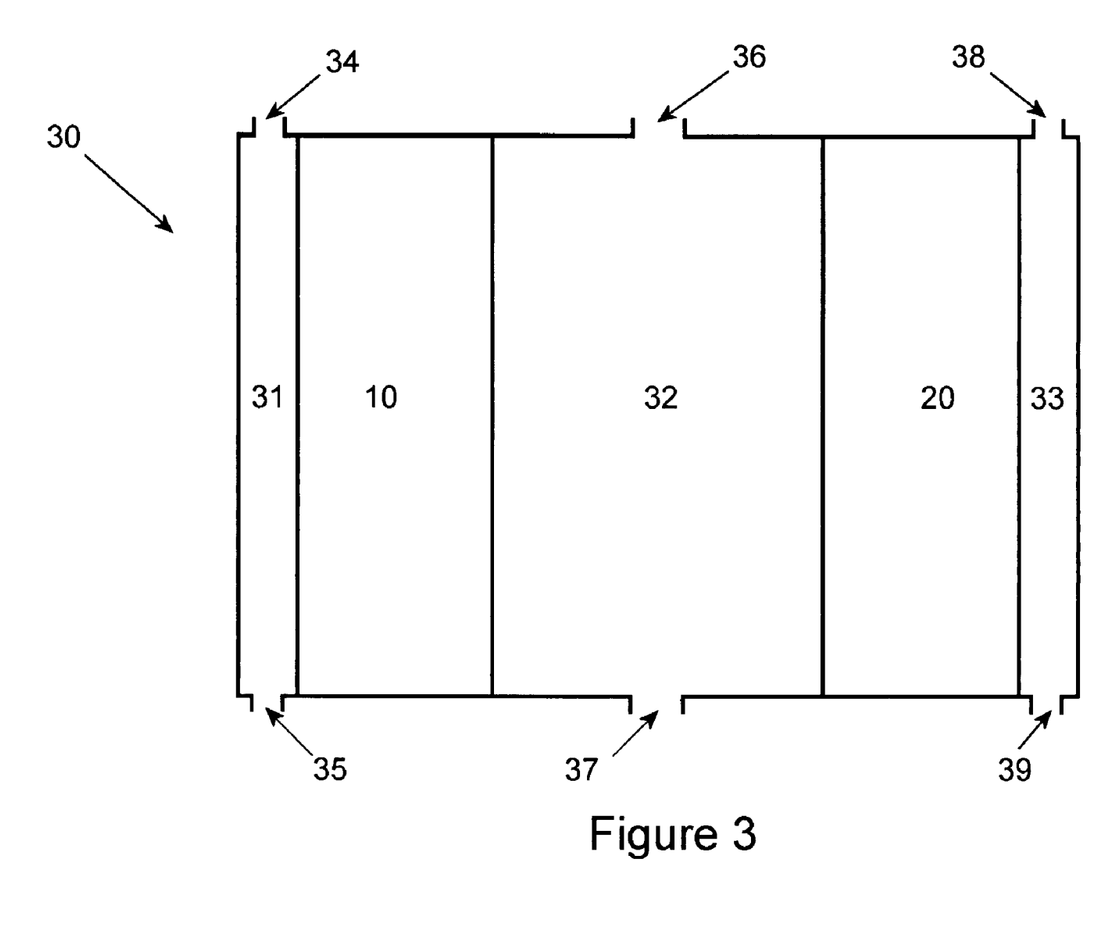
FIG. 3, is a depiction of a fuel cell in accordance with the present invention.

FIG. 3 is a stylized schematic depiction of an alkaline fuel cell 30 incorporating the low temperature hydrogen electrode 10 and oxygen electrode 20 of the present invention. The fuel cell 30 consists of three general sections: 1) a hydrogen electrode section, which includes the hydrogen electrode 10 and a hydrogen supply compartment 31; 2) the electrolyte compartment 32; and 3) the oxygen electrode section, which includes the oxygen electrode 20 and the oxygen (air) supply compartment 33.

In the hydrogen electrode section, hydrogen or hydrogen containing gas mixtures is supplied under pressure to the hydrogen supply compartment 31 through hydrogen inlet 34. Hydrogen is then distributed through the gas diffusion layer 11 and absorbed into the active material layer 12 of the hydrogen electrode 10. The absorbed hydrogen is catalytically broken down by the negative electrode active material into atomic hydrogen which is stored in the hydrogen storage material as a hydride, and then finally reacts at with the electrolyte to form water. It should be noted that the heat of hydride formation helps to warm the fuel cell to it's optimal operating temperature. Any unabsorbed hydrogen and other contaminant gases or water vapor in the hydrogen supply may be vented through outlet 35. The gases that are vented may be recycled if enough hydrogen is present to warrant recovery. Otherwise the hydrogen may be used to provide a source of thermal energy if needed for other components such as a hydride bed hydrogen storage tank.

The electrolyte compartment 32 contains an aqueous alkaline electrolyte in intimate contact with the electrolyte interfaces of the hydrogen electrode 10 and the oxygen electrode 20. The alkaline solution is well known in the art and is typically a potassium hydroxide solution. The electrolyte provides hydroxyl ions which react with hydrogen ions at surface of the hydrogen electrode 10 and water molecules which react with oxygen ions at surface of the oxygen electrode 20. The electrolyte is circulated through compartment 32 via inlet 36 and outlet 37 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any loses due to evaporation of water through the electrodes. Systems for conditioning the fuel cell electrolyte are well known in the art and need not be further described in detail herein.

In the oxygen electrode section, oxygen, air, or some other oxygen containing gaseous mixture is supplied to the oxygen supply compartment 33 through oxygen inlet 38. Oxygen is then absorbed through into the oxygen electrode 20. The absorbed oxygen is catalytically broken down by the catalytically active material into ionic oxygen, which finally reacts with water molecules contained in the electrolyte to form hydroxyl ions. Any unabsorbed oxygen and other gases in the feed (e.g. nitrogen, carbon dioxide, etc.) or water vapor in the oxygen supply are vented through outlet 39.

Example 1

An alkaline fuel cell in accordance with the present invention was constructed and tested. The alkaline fuel cell included a hydrogen and oxygen electrode in accordance with the present invention. The hydrogen and oxygen electrode were contact with a potassium hydroxide solution.

The hydrogen electrode of the alkaline fuel cell is composed of a gas diffusion layer and an active material layer. The gas diffusion layer of the hydrogen electrode is composed of a mixture of 60 weight percent Teflon and 40 weight percent Vulcan XC-72 carbon (Trademark of Cabot Corp.). The active material layer of the hydrogen electrode is composed of 52.8 weight percent Raney Nickel, 35.2 weight percent of the B1 alloy, 8 weight percent teflon, and 4 weight percent graphite. The gas diffusion layer and the active material layer were formed into ribbons and pressed between two current collector grids. The hydrogen electrode was then sintered at 325° C. for half an hour.

The oxygen electrode of the alkaline fuel cell is composed of a gas diffusion layer and an active material layer. The gas diffusion layer of the oxygen electrode is composed of a mixture of 60 weight percent teflon and 40 weight percent Vulcan XC-72 carbon (Trademark of Cabot Corp.). The active material layer is composed of 92 weight percent of the CoTMPP supported catalyst and 8 weight percent teflon. The oxygen electrode gas diffusion layer and the oxygen electrode active material layer were each formed into a paste and applied onto a current collector grid. The current collector grids were then placed together and rolled to form the oxygen electrode.

Figure 4:
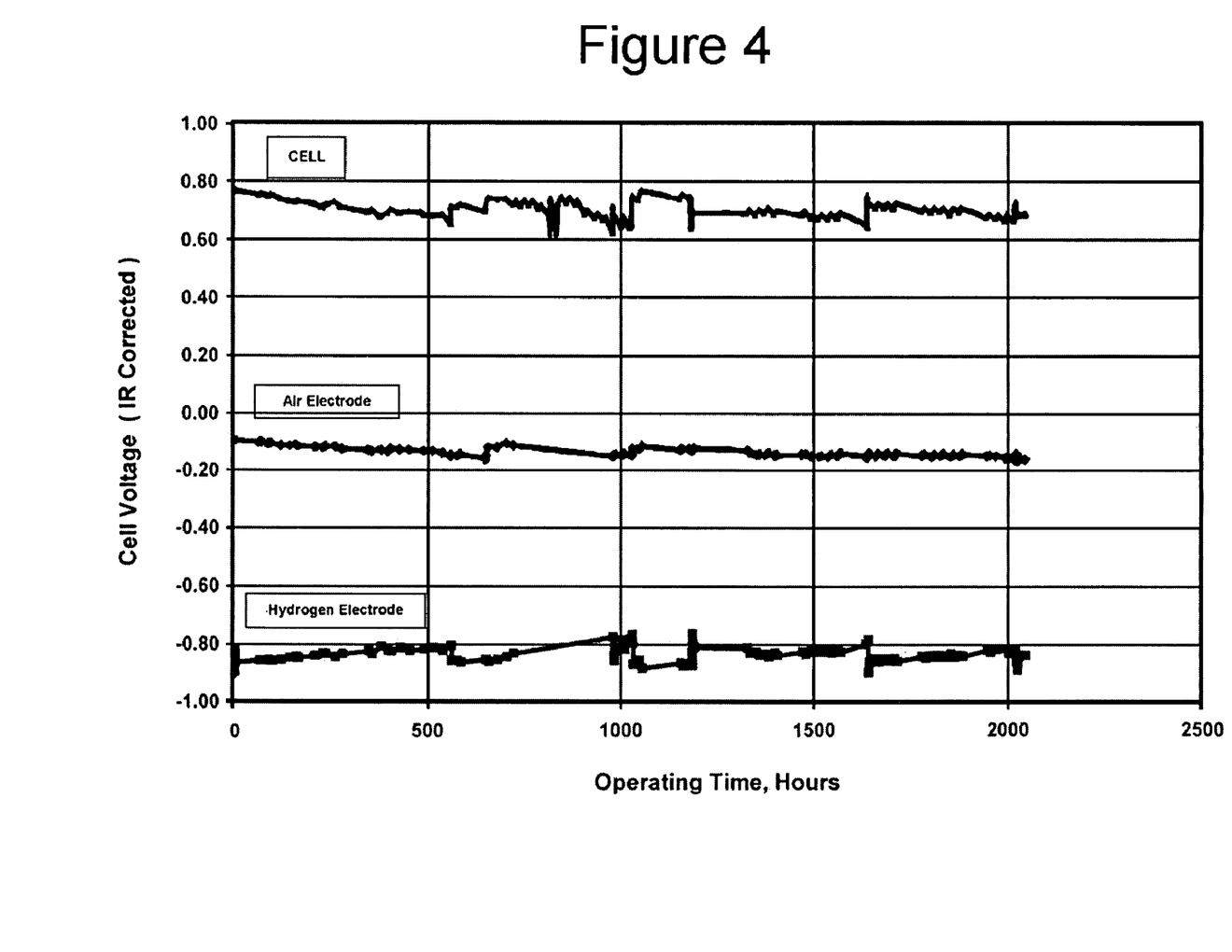
FIG. 4, is a plot showing the cycle life of a fuel cell in accordance with the present invention.
Figure 5:
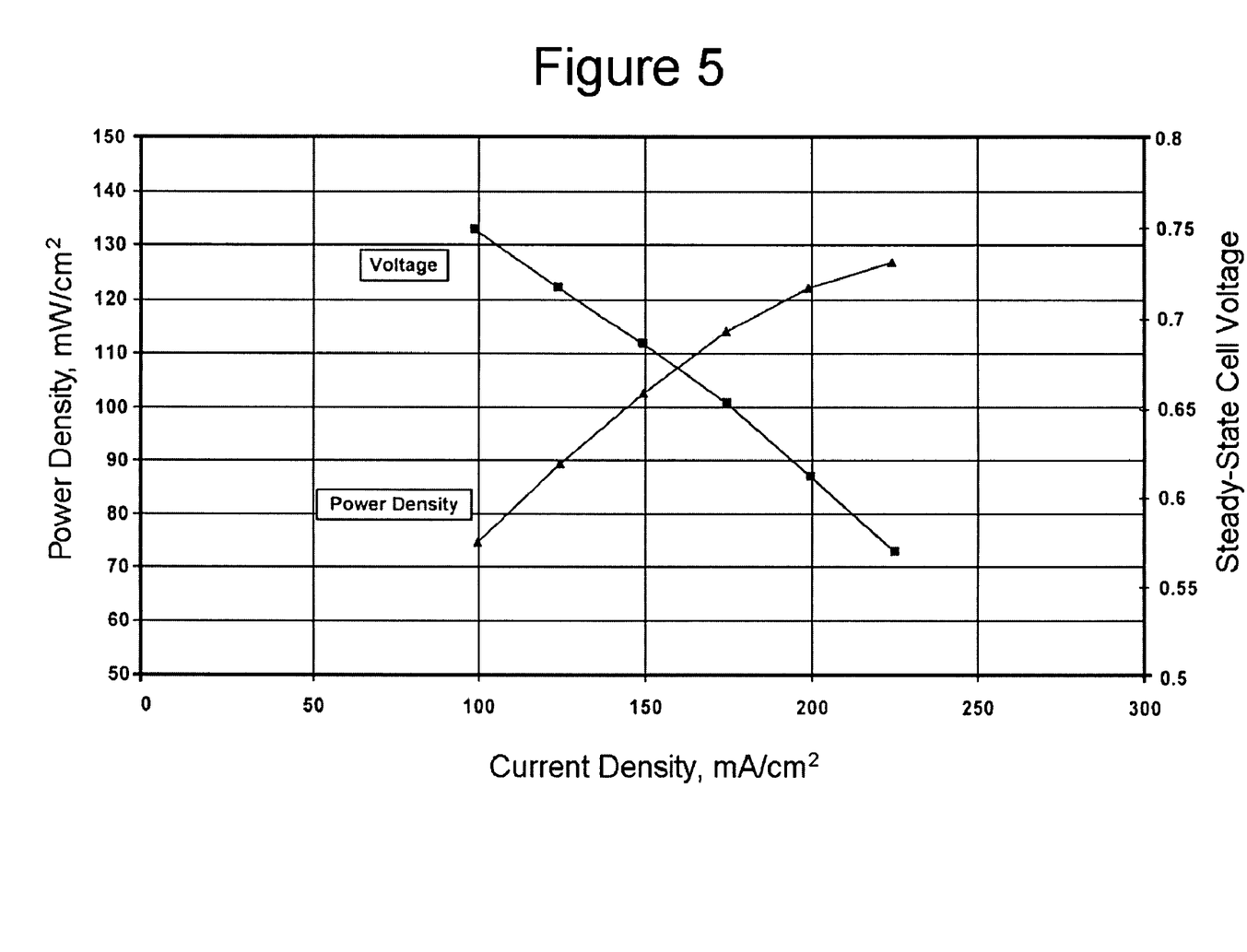
FIG. 5, is a plot showing the power density of a fuel cell in accordance with the present invention.

The alkaline fuel cell was tested for cycle life and power density at ambient temperatures. FIG. 4, is a plot demonstrating the cycle life of the fuel cell. The fuel cell maintained a constant cell voltage of approximately 0.7 volts for over 2000 hours at ambient conditions. FIG. 5, shows a power determination of the fuel cell at 25° C. after 1177 hours of operation.

Example 2

Three metal hydride negative electrodes in accordance with the present invention were prepared and tested at −30° C. The first negative electrode included the $B_0$ alloy (control), the second electrode included the $B_1$ alloy, and the third electrode included the $B_{12}$ alloy. The metal hydride negative electrodes were standard compacted negative electrodes including either the $B_0$, the $B_1$, or the $B_{12}$ alloy.

Figure 6:
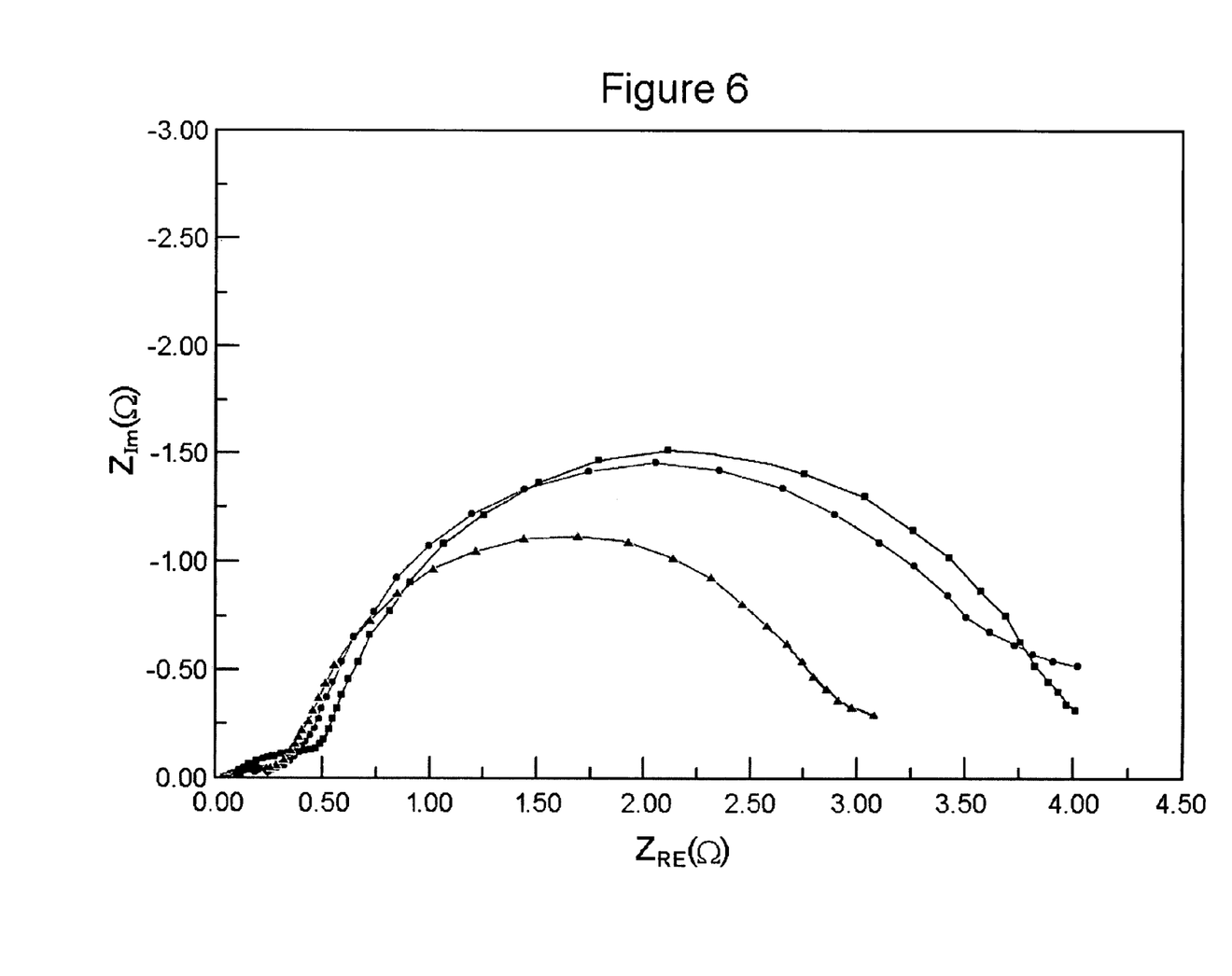
FIG. 6, is a plot of the imaginary part ($Z_{im}$) of the complex impedance as a function of the real part ($Z_{RE}$) of the complex impedance measured at −30° C. for three metal hydride electrodes.

The charge transfer resistance ($R_{CT}$) and double layer capacitance ($C_{dl}$) of the three electrodes were obtained through complex impedance measurements completed at −30° C. The results of the measurements are presented in FIG. 6, which shows the imaginary part ($Z_{Im}$) of the complex impedance as a function of the real part ($Z_{RE}$) of the complex impedance. The $B_0$ alloy is represented by ■, the $B_1$ alloy is represented by ▲, and the $B_{12}$ alloy is represented by ●. The charge transfer resistance ($R_{CT}$) and double layer capacitance ($C_{dl}$) were obtained from the curves using standard electrochemical equations. The intercept of each curve with the $Z_{RE}$ axis provides the Ohmic resistance of each battery. The charge transfer resistance can be determined from the diameter of the semicircular portion of each curve and the slope of the upwardly sloping portion of each curve is related to the diffusion resistance. The double layer capacitance can be obtained from the standard electrochemical equations used in the analysis of the semicircular portion of each curve. The results of the analysis are summarized in Table 2.

TABLE 2

| Sample | $R_{CT}$ (Ohm * g) | $C_{dl}$ (F/g) |
|---|---|---|
| $B_0$ | 1.16 | 0.78 |
| $B_1$ | 0.68 | 1.18 |
| $B_{12}$ | 0.80 | 1.35 |

The results indicate that the charge transfer resistance of the negative electrodes including the instant $B_1$ and $B_{12}$ alloys are substantially lower than the charge transfer resistance of the electrode that includes the conventional $B_0$ alloy at $-30°$ C. The lower charge transfer resistance for the negative electrodes including the $B_1$ and $B_{12}$ alloys indicate faster electrode kinetics which leads to improved performance. The improved performance is achieved due to greater species mobility in the vicinity of metallic catalytic particles within the negative electrode. The increased species mobility results from an increased porosity of the surrounding support matrix and/or increased density of catalytic metallic particles due to the microstructure engineering according to the present invention. The results also indicate that the double layer capacitance of the electrodes containing the instant $B_1$ and $B_{12}$ alloys was greater than that of the electrode containing the conventional $B_0$ alloy at $-30°$ C. A higher double layer capacitance indicates a higher surface area of electrochemical reaction for the electrode containing the $B_1$ and $B_{12}$ alloys. The complex impedance results of this example are consistent with faster electron transfer in negative fuel cell electrodes that include negative electrodes containing the instant $B_1$ and $B_{12}$ alloys as compared to negative electrodes utilizing conventional hydrogen storage alloys.

The foregoing is provided for purposes of explaining and disclosing preferred embodiments of the present invention. Modifications and adaptations to the described embodiments, particularly involving changes to the design of the fuel cell and components thereof will be apparent to those skilled in the art. These changes and others may be made without departing from the scope or spirit of the invention in the following claims.

The invention claimed is:

1. An alkaline fuel cell comprising:
at least one hydrogen electrode having a gas diffusion layer adjacent an active material layer; and
at least one oxygen electrode having a gas diffusion layer adjacent an active material layer;
said hydrogen electrode including an active material layer comprising a hydrogen storage alloy having a bulk region and an interface region, said interface region having a pore volume greater than 5%;
wherein, said interface region comprises a plurality of catalytic metallic particles and a porous support matrix for supporting said catalytic metallic particles.

2. The alkaline fuel cell according to claim 1, wherein said hydrogen electrode further includes a gas diffusion layer comprising a plurality of carbon particles at least partially coated with a hydrophobic material.

3. The alkaline fuel cell according to claim 2, wherein said gas diffusion layer comprises 20 to 60 weight percent of said hydrophobic material and 40 to 80 weight percent carbon particles.

4. The alkaline fuel cell according to claim 1, wherein said porous support matrix comprises one or more of: a) a metallic oxide containing one or more metals selected from transition metals, rare earth metals, aluminum, or tin; b) a metallic hydroxide containing one or more metals selected from transition metals, rare earth metals, aluminum, or tin.

5. The alkaline fuel cell according to claim 1, wherein said plurality of catalytic metallic particles have a diameter of less than 100 Å.

6. The alkaline fuel cell according to claim 1, wherein said plurality of catalytic metallic particles comprise a nickel-cobalt-copper alloy.

7. The alkaline fuel cell according to claim 1, wherein the volume fraction of said plurality of catalytic metallic particles in said interface region is greater than 30%.

8. The alkaline fuel cell according to claim 1, wherein said plurality of catalytic metallic particles vary in proximity from 2 to 300 Å in said interface region.

9. The alkaline fuel cell according to claim 1, wherein said bulk region comprises a Rare-earth metal alloy, a Misch metal alloy, a zirconium alloy, a titanium alloy, a magnesium/nickel alloy, or mixtures and alloys thereof.

10. The alkaline fuel cell according to claim 1, wherein said hydrogen storage alloy has the formula $La_{10.5}Ce_{4.3}Pr_{0.5}Nd_{1.4}Ni_{64.5}Co_{5.0}Mn_{4.6}Al_{6.0}Cu_{3.4}$.

11. The alkaline fuel cell according to claim 1, wherein said hydrogen storage alloy has the formula $La_{10.5}Ce_{4.3}Pr_{0.5}Nd_{1.4}Ni_{64.5}Co_{3.0}Mn_{4.6}Al_{6.0}Cu_{5.4}$.

12. The alkaline fuel cell according to claim 1, wherein said oxygen electrode comprises a gas diffusion layer comprising a plurality of carbon particles at least partially coated with a hydrophobic material.

13. The alkaline fuel cell according to claim 12, wherein said gas diffusion layer comprises 30 to 60 weight percent of said hydrophobic material and 40 to 70 weight percent carbon particles.

14. The alkaline fuel cell according to claim 1, wherein said oxygen electrode includes an active material layer comprising a supported catalyst comprising a carrier matrix and a mixed-valence nanoclustered metal oxide supported by said carrier matrix.

15. The alkaline fuel cell according to claim 14, wherein said carrier matrix is carbon based.

16. The alkaline fuel cell according to claim 14, wherein said mixed-valence nanoclustered metal oxide includes at least one transition metal.

17. The alkaline fuel cell according to claim 14, wherein said supported catalyst further comprises an organometallic supported by said carrier matrix.

18. The alkaline fuel cell according to claim 17, wherein said mixed valence, nanoclustered metal oxide is in contact with said organometallic.

19. The alkaline fuel cell according to claim 17, wherein said organometallic comprises a macrocycle including at least one transition metal.

20. The alkaline fuel cell according to claim 14, wherein said supported catalyst further comprises a second carrier matrix and an organometallic substantially uniformly distributed about and supported by said second carrier matrix.

21. The alkaline fuel cell according to claim 20, wherein said second carrier matrix is carbon based.

22. The alkaline fuel cell according to claim 14, wherein said mixed valence, nanoclustered metal oxide comprises mostly cobalt oxides.

23. The alkaline fuel cell according to claim 14, wherein said mixed valence, nanoclustered metal oxide comprises mostly manganese oxides.

24. The alkaline fuel cell according to claim 14, wherein said mixed valence, nanoclustered metal oxide comprises mostly cobalt-manganese oxides.

25. In a fuel cell, a hydrogen electrode comprising: a gas diffusion layer adjacent an active material layer, said active material layer comprising a hydrogen storage alloy having a bulk region and an interface region, said interface region having a pore volume greater than 5%;
wherein, said interface region comprises a plurality of catalytic metallic particles and a porous support matrix for supporting said catalytic metallic particles.

26. The hydrogen electrode according to claim 25, wherein said hydrogen electrode further includes a gas diffusion layer comprising a plurality of carbon particles at least partially coated with a hydrophobic material.

27. The hydrogen electrode according to claim 26, wherein said gas diffusion layer comprises 20 to 60 weight percent of said hydrophobic material and 40 to 80 weight percent carbon particles.

28. The hydrogen electrode according to claim 25, wherein said porous support matrix comprises one or more of a) a metallic oxide containing one or more metals selected from transition metals, rare earth metals, aluminum, or tin; b) a metallic hydroxide containing one or more metals selected from transition metals, rare earth metals, aluminum, or tin.

29. The hydrogen electrode according to claim 25, wherein said plurality of catalytic metallic particles have a diameter of less than 100 Å.

30. The hydrogen electrode according to claim 25, wherein said plurality of catalytic metallic particles comprise a nickel-cobalt-copper alloy.

31. The hydrogen electrode according to claim 25, wherein the volume fraction of said plurality of catalytic metallic particles in said interface region is greater than 30%.

32. The hydrogen electrode according to claim 25, wherein said plurality of catalytic metallic particles vary in proximity from 2 to 300 .ANG. in said interface region.

33. The hydrogen electrode according to claim 25, wherein said bulk region comprises a Rare-earth metal alloy, a Misch metal alloy, a zirconium alloy, a titanium alloy, a magnesium/nickel alloy, or mixtures and alloys thereof.

* * * * *